United States Patent
Mazumder et al.

(10) Patent No.: US 8,117,821 B2
(45) Date of Patent: Feb. 21, 2012

(54) OPTIMIZATION OF LOW-BTU FUEL-FIRED COMBINED-CYCLE POWER PLANT BY PERFORMANCE HEATING

(75) Inventors: Indrajit Mazumder, Bangalore (IN); Rajarshi Saha, Bangalore (IN); Shivaprasad Lokanath, Mangalore (IN); Vinod Kumar Baikampady Gopalkrishna, Mangalore (IN)

(73) Assignee: General Electric Company, Schenectady, NY (US)

(*) Notice: Subject to any disclaimer, the term of this patent is extended or adjusted under 35 U.S.C. 154(b) by 509 days.

(21) Appl. No.: 12/369,180

(22) Filed: Feb. 11, 2009

(65) Prior Publication Data

US 2010/0199683 A1 Aug. 12, 2010

(51) Int. Cl.
*F02C 6/08* (2006.01)

(52) U.S. Cl. ........ 60/39.12; 60/39.182; 60/783; 60/736; 60/772; 60/780

(58) Field of Classification Search .................. 60/39.12, 60/39.182, 783, 736, 772, 780, 785
See application file for complete search history.

(56) References Cited

U.S. PATENT DOCUMENTS

| | | | | |
|---|---|---|---|---|
| 2,925,712 A * | 2/1960 | London et al. | | 60/785 |
| 5,392,595 A * | 2/1995 | Glickstein et al. | | 60/780 |
| 6,065,280 A | 5/2000 | Ranasinghe et al. | | |
| 6,216,441 B1 | 4/2001 | Stats et al. | | |
| 6,463,741 B1 * | 10/2002 | Frutschi | | 60/780 |
| 6,499,302 B1 | 12/2002 | Ranasinghe | | |
| 6,543,234 B2 | 4/2003 | Anand et al. | | |
| 6,920,760 B2 | 7/2005 | Schottler et al. | | |
| 2006/0248894 A1 | 11/2006 | Hiramoto et al. | | |

* cited by examiner

*Primary Examiner* — Ehud Gartenberg
*Assistant Examiner* — Steven Sutherland
(74) *Attorney, Agent, or Firm* — Hoffman Warnick LLC; Ernest G. Cusick

(57) ABSTRACT

Disclosed is an optimized approach of using bleed-off of compressed air flow from a gas turbine compressor in a combined-cycle power plant and performance heating to augment plant performance. In one embodiment, a diverted portion of a by-product off gas and the bleed-off of compressed air flow are fired heated to produce a high temperature flue gas that is used to performance heat a pressurized mixture of fuel prior to being supplied to the gas turbine combustor.

10 Claims, 2 Drawing Sheets

OPTIMIZATION OF LOW-BTU FUEL-FIRED COMBINED-CYCLE POWER PLANT BY PERFORMANCE HEATING

BACKGROUND OF THE INVENTION

The present invention relates generally to a low-BTU fuel-fired combined-cycle power plant and more particularly to optimizing fuel supplied to a gas turbine and improving the efficiency and power output in a combined-cycle power plant through performance heating of the fuel.

A low-BTU fuel-fired combined-cycle power plant is one type of combined-cycle power plant that has been implemented to provide higher efficiency and lower emissions as compared to traditional boiler power plants. Low-BTU gases such as blast furnace gas (BFG) and coke oven gas (COG) are typically created during the production of pig iron in steel mills as a by-product of coke combustion and iron ore melt in blast furnaces. In a power plant scenario, low-BTU gases are recovered and used as fuel in a gas turbine combined-cycle power generation solution that can generate power to be used both in the steel mills and sold to the public power grid.

BRIEF DESCRIPTION OF THE INVENTION

In one aspect of the present invention, a low BTU fuel-based combined-cycle power plant is provided. The combined-cycle power plant comprises a gas-mixing unit that mixes by-product off-gases. A fuel gas compressor coupled to the gas-mixing unit pressurizes the mixture of by-product off-gases. A gas turbine is fueled by the pressurized mixture of by-product off-gases from the fuel gas compressor. The gas turbine comprises a compressor; a combustor that receives air from the compressor and the pressurized mixture of by-product off-gases from the fuel gas compressor for combustion thereof; and a turbine that expands hot gas generated from the combustion of the air from the compressor and the pressurized mixture of by-product off-gases from the fuel gas compressor. The combined-cycle power plant further comprises a fired heating unit that receives a diverted portion of the by-product off-gases and a bleed-off of compressed air flow from the gas turbine compressor for combustion thereof. The combustion of the diverted portion of the by-product off-gases and the bleed-off of compressed air flow in the fired heating unit produces a high temperature flue gas. The combined-cycle power plant also comprises a performance heating unit that heats the pressurized mixture of by-product off-gases from the fuel gas compressor with the high temperature flue gas produced from the fired heating unit prior to entering the gas turbine combustor.

In another aspect of the present invention, a blast furnace gas fired combined-cycle power plant is provided. In this aspect of the present invention, the blast furnace gas combined-cycle power plant comprises a gas mixing unit that mixes blast furnace gas and coke oven gas. A fuel gas compressor coupled to the gas-mixing unit pressurizes the mixture of the blast furnace gas and coke oven gas. A gas turbine is fueled by the pressurized mixture of the blast furnace gas and coke oven gas from the fuel gas compressor. The gas turbine comprises a compressor; a combustor that receives air from the compressor and the pressurized mixture of the blast furnace gas and coke oven gas from the fuel gas compressor for combustion thereof; and a turbine that expands hot gas generated from the combustion of the air from the compressor and the pressurized mixture of the blast furnace gas and coke oven gas from the fuel gas compressor. The blast furnace gas combined-cycle power plant further comprises a fired heating unit that receives a diverted portion of the blast furnace gas and a bleed-off of compressed air flow from the gas turbine compressor for combustion thereof. The combustion of the diverted portion of the blast furnace gas and the bleed-off of compressed air flow in the fired heating unit produces a high temperature flue gas. The blast furnace gas combined-cycle power plant also comprises a performance heating unit that heats the pressurized mixture of blastfurnace gas and coke oven gas from the fuel gas compressor with the high temperature flue gas produced from the fired heating unit prior to entering the gas turbine combustor.

In a third aspect of the present invention, there is a method of increasing the temperature of a low-BTU fuel used in a blast furnace gas combined-cycle power plant. In this aspect of the present invention, the method comprises mixing a blast furnace gas and coke oven gas; pressurizing the mixture of the blast furnace gas and coke oven gas; fired heating a diverted portion of the blast furnace gas and a bleed-off of compressed air flow from a gas turbine compressor for combustion thereof; and performance heating the pressurized mixture of blast furnace gas and coke oven gas with a high temperature flue gas produced from the combustion of the diverted portion of the blast furnace gas and the bleed-off of compressed air flow prior to supplying to a gas turbine combustor.

DETAILED DESCRIPTION OF THE INVENTION

Figure 1:
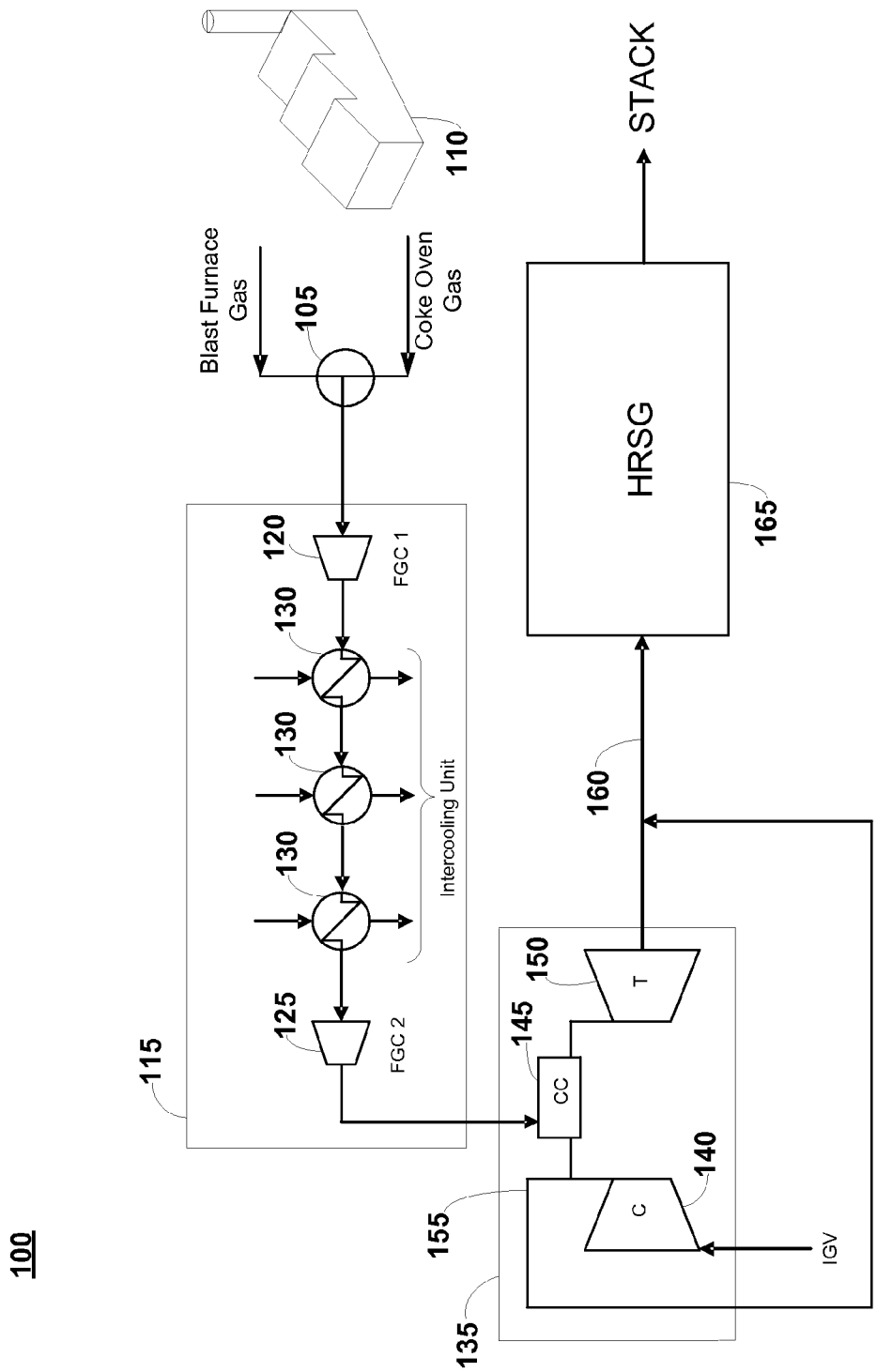
FIG. 1 is a schematic diagram of a conventional BFG-fired combined-cycle power plant.

Referring to the drawings, FIG. 1 shows a schematic diagram of a conventional BFG-fired combined-cycle power plant 100. As shown in FIG. 1, by-product off-gases that include BFG and COG are supplied to a gas mixing unit 105 from a steel mill 110. Although not illustrated in FIG. 1, other by product off-gases emitted from steel mill 110 such as Linz Donawitz Gas (LDG) and COREX Gas can be used as low-BTU fuels. Generally, the amount of BFG supplied to gas mixing unit 105 is significantly more than the amount of COG. For example, mixing unit 105 may receive about 250 pps of BFG and about 10 pps of COG from steel mill 110. The amount of both the BFG and COG supplied from steel mill 110 are typically at a low pressure and thus the mixture of the BFG and COG resulting from gas mixing unit 105 is generally at a low pressure of about 15.5 psia. This gas mixture needs to be boosted to a higher pressure in order to be used as a fuel for a gas turbine combustor.

A centrifugal fuel gas compressor 115 is used by BFG-fired combined-cycle power plant 100 to boost the pressure of the gas mixture of BFG and COG to about 300 psia. As shown in FIG. 1, fuel gas compressor 115 is a multi-stage fuel gas compressor that comprises in this embodiment a first fuel gas compressor (FGC 1) 120 and a second fuel gas compressor (FGC 2) 125. Intercooling units 130 are located between FGC 1 120 and FGC 2 125 in order to improve the efficiency of fuel gas compressor 115.

Fuel gas compressor 115 supplies this gas mixture of BFG and COG to a gas turbine 135. Gas turbine comprises a compressor 140 that pulls air from an inlet guide vane (IGV), a combustor 145 that receives the compressed air from compressor 140 and the pressurized mixture of by-product off-gases from fuel gas compressor 115 for combustion thereof;

and a turbine 150 that expands hot gas generated from the combustion of the air from compressor 140 and the pressurized mixture of by-product off-gases from fuel gas compressor 115. As shown in FIG. 1, a bleed-off of compressed air flow is discharged from compressor 140, which is represented by reference element 155. The bleed-off of compressed air flow is supplied to mix with the exhaust products generated by turbine 150, which is represented by reference element 160. This bleed-off of compressed air flow from compressor 140 to the exhaust of turbine 150 is known as compressor over-board bleed (OBB) and is done in order to prevent surge in compressor 140.

A heat recovery steam generator (HRSG) 165 receives the exhaust products from turbine 150 for recovering waste heat from the exhaust products. Heat recovered from the exhaust products is transferred to water/steam in HRSG 165 for producing steam which is supplied to a steam turbine (not illustrated) for driving a generator (not illustrated). Cooled gases from HRSG 165 are discharged into the atmosphere via a stack. Those skilled in the art will recognize that this part of BFG combined-cycle power plant 100 may have other components (e.g., a condenser, water lines, etc.), but for ease of illustration of embodiments of the present invention have been omitted. Likewise, those skilled in the art will recognize that the part of BFG-fired combined-cycle power plant 100 that relates to gas turbine 135 may have other components not shown (e.g., a gas turbine generator), but for ease of illustration of embodiments of the present invention, these components have been omitted.

As determined herein, there are some drawbacks associated with the operation of BFG-fired combined-cycle power plant 100. For instance, because the gas mixture of the BFG and COG has a low LHV, a tremendous amount of fuel is needed to attain the firing temperature in combustor 145 of gas turbine 135. A result of needing a lot of fuel is that fuel gas compressor 115 will have to compress more of this low LHV fuel. Consequently, there is large power consumption by fuel gas compressor 115 that reduces the net combined cycle output. Another drawback associated with the operation of BFG-fired combined-cycle power plant 100 is in the manner that the OBB is utilized. In particular, it has been found herein that the discharge of the OBB from compressor 140 to exhaust 160 of turbine 150 reduces the overall efficiency of combined-cycle power plant 100.

Figure 2:
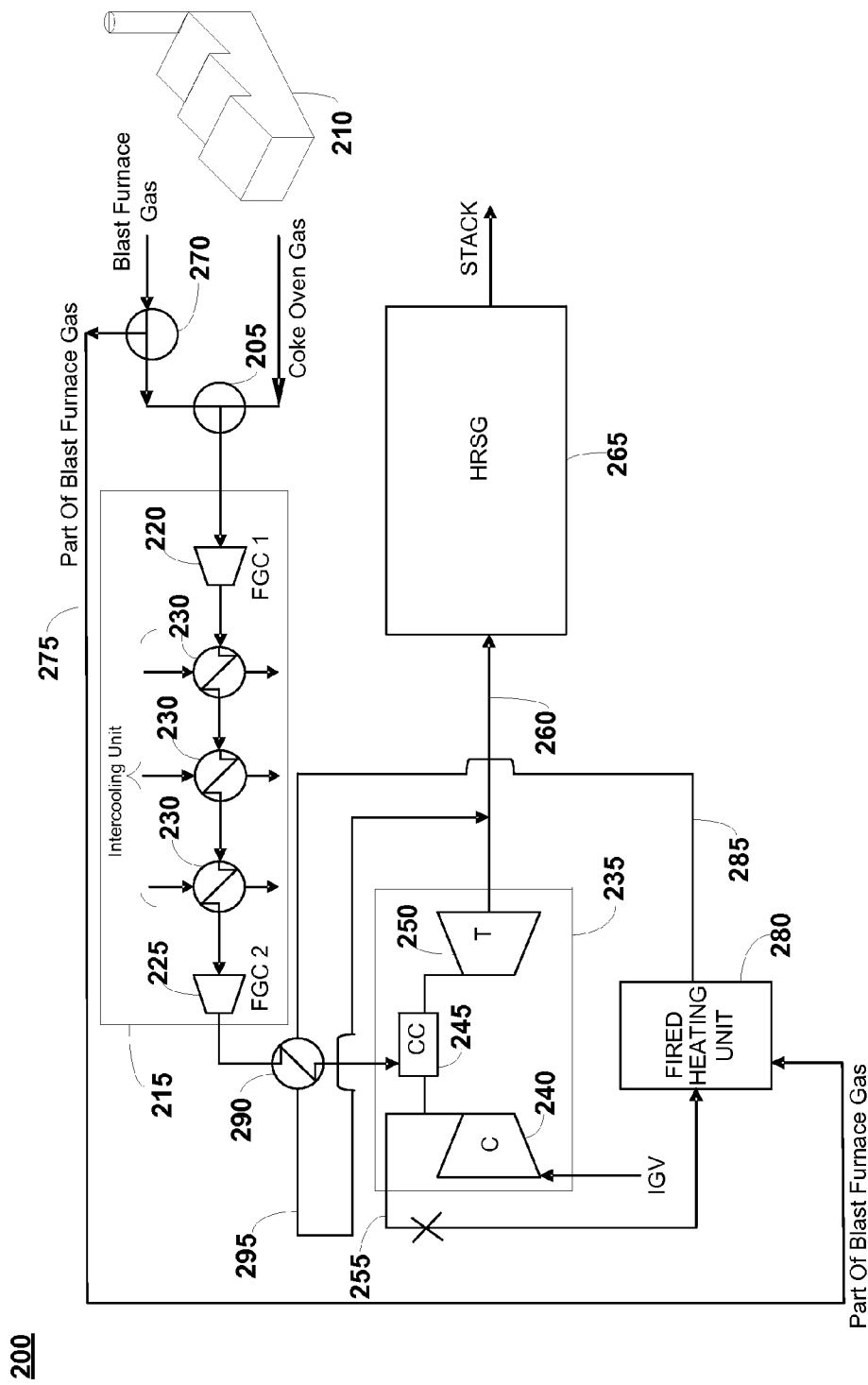
FIG. 2 is a schematic diagram of a BFG-fired combined-cycle power plant according to one embodiment of the present invention.

FIG. 2 is a schematic diagram of a BFG fired combined-cycle power plant 200 that has optimized the drawbacks noted above to improve efficiency and power output. Components in FIG. 2 that are similar to components used in FIG. 1 are applied with like reference elements, except that the reference elements used in FIG. 2 are preceded with the numeral 2. FIG. 2 like FIG. 1 shows only portions of BFG-fired combined-cycle power plant 200 that are necessary to explain its operation and the embodiments described herein that are directed to the optimization thereof.

As shown in FIG. 2, a BFG gas splitter 270 diverts a portion of BFG from steel mill 210 prior to its mixing with the COG in gas mixing unit 205. In one embodiment, about 21.5 pps of BFG having a pressure of about 15.5 psia and a temperature of about 104° F. (40° C.) is diverted by BFG gas splitter 270. The part of BFG that is diverted is represented by reference element 275.

A fired heating unit 280 receives the diverted part of BFG and the OBB 255 that is discharged from compressor 240 for combustion thereof. Fired heating unit 280 produces a high temperature flue gas that is represented by reference element 285. A performance heating unit 290 uses high temperature flue gas 285 to heat the pressurized mixture of BFG and COG that is generated from fuel gas compressor 215 prior to its entering into combustor 245 of gas turbine 255. In one embodiment, performance heating unit 290 is a heat exchanger which raises the temperature of the pressurized mixture of BFG and COG by about 250° F. (121° C.) prior to being supplied to combustor 245. Exhaust gas 295 from performance heating unit 295 is mixed with exhaust gas 260 from turbine 250 of gas turbine 255. Although exhaust gas 295 is mixed with exhaust gas 260 from turbine 250 before HRSG inlet in one embodiment, those skilled in the art will recognize that it can be supplied to other intermediate locations of HRSG 265 without mixing with exhaust gas 260.

As shown herein, efficiency and power output of FIG. 2 has been improved because performance heating unit 290 preheats the pressurized mixture of BFG and COG with high temperature flue gas 285 from fired heating unit 290. This feature means that less fuel is needed through fuel gas compressor 215 to attain the firing temperature in combustor 245 of gas turbine 255. As a result, power consumption by fuel gas compressor 215 is reduced, which translates to an increase in net output and net efficiency of BFG fired combined-cycle power plant 200. Also, because the fuel flow requirement has been reduced for fuel gas compressor 215 there is a relaxation in the surge margin at compressor 240, which translates to less OBB being discharged (i.e., about 30% reduction). Consequently, this feature also contributes to the improvement in the overall efficiency of BFG fired combined-cycle power plant 200. Thus implementing the idea enclosed herewith will provide an net combined cycle output gain of about +1.44 MW and an efficiency gain of about +0.37%.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A low BTU fuel based combined-cycle power plant, comprising:

a gas mixing unit that mixes by-product off-gases, wherein the by-product off-gases include blast furnace gas and coke oven gas;

a fuel gas compressor coupled to the gas mixing unit that pressurizes the mixture of by-product off-gases;

a gas turbine fueled by the pressurized mixture of by-product off-gases from the fuel gas compressor, the gas turbine comprising a compressor; a combustor that receives air from the compressor and the pressurized mixture of by-product off-gases from the fuel gas compressor for combustion thereof; and a turbine that expands hot gas generated from the combustion of the air from the compressor and the pressurized mixture of by-product off-gases from the fuel gas compressor;

a fired heating unit that receives a diverted portion of the by-product off-gases and a bleed-off of compressed air flow from the gas turbine compressor for combustion thereof, wherein the diverted portion of the by-product off-gases received by the fired heating unit comprise a portion of the blast furnace gas, the combustion of the diverted portion of the by-product off-gases and the bleed-off of compressed air flow in the fired heating unit producing a high temperature flue gas; and a performance heating unit that heats the pressurized mixture of by-product off-gases from the fuel gas compressor with the high temperature flue gas produced from the fired heating unit prior to entering the gas turbine combustor, wherein exhaust gas from the performance heating unit is mixed with exhaust gas from the gas turbine.

2. The combined-cycle power plant according to claim 1, wherein the fuel gas compressor comprises a multi-stage fuel gas compressor with at least one intercooling unit located between each stage.

3. The combined-cycle power plant according to claim 1, wherein the performance heating unit comprises a heat exchanger.

4. The combined-cycle power plant according to claim 1, further comprising a heat recovery steam generator that receives exhaust gas from the gas turbine.

5. A blast furnace gas fired combined-cycle power plant, comprising:
   a gas mixing unit that mixes blast furnace gas and coke oven gas;
   a fuel gas compressor coupled to the gas mixing unit that pressurizes the mixture of the blast furnace gas and coke oven gas;
   a gas turbine fueled by the pressurized mixture of the blast furnace gas and coke oven gas from the fuel gas compressor, the gas turbine comprising a compressor; a combustor that receives air from the compressor and the pressurized mixture of the blast furnace gas and coke oven gas from the fuel gas compressor for combustion thereof; and a turbine that expands hot gas generated from the combustion of the air from the compressor and the pressurized mixture of the blast furnace gas and coke oven gas from the fuel gas compressor;
   a fired heating unit that receives a diverted portion of the blast furnace gas and a bleed-off of compressed air flow from the gas turbine compressor for combustion thereof, the combustion of the diverted portion of the blast furnace gas and the bleed-off of compressed air flow in the fired heating unit producing a high temperature flue gas; and
   a performance heating unit that heats the pressurized mixture of blast furnace gas and coke oven gas from the fuel gas compressor with the high temperature flue gas produced from the fired heating unit prior to entering the gas turbine combustor, wherein exhaust gas from the performance heating unit is mixed with exhaust gas from the gas turbine.

6. The blast furnace gas combined-cycle power plant according to claim 5, wherein the fuel gas compressor comprises a multi-stage fuel gas compressor with at least one intercooling unit located between each stage.

7. The blast furnace gas combined-cycle power plant according to claim 5, wherein the performance heating unit comprises a heat exchanger.

8. The blast furnace gas combined-cycle power plant according to claim 5, further comprising a heat recovery steam generator that receives exhaust gas from the gas turbine.

9. A method of increasing the temperature of a low-BTU fuel used in a blast furnace gas combined-cycle power plant, comprising:
   mixing a blast furnace gas and coke oven gas;
   pressurizing the mixture of the blast furnace gas and coke oven gas;
   fired heating a diverted portion of the blast furnace gas and a bleed-off of compressed air flow from a gas turbine compressor for combustion thereof; and
   performance heating the pressurized mixture of blast furnace gas and coke oven gas with a high temperature flue gas produced from the combustion of the diverted portion of the blast furnace gas and the bleed-off of compressed air flow prior to supplying to a gas turbine combustor; and mixing exhaust gas from the performance heating with exhaust gas from the gas turbine.

10. The method according to claim 9, further comprising supplying the exhaust gas from a gas turbine to a heat recovery steam generator.

* * * * *